May 3, 1938. E. ROBERTS Re. 20,715
LIQUID COOLED FRICTION DRUM
Original Filed March 9, 1935 2 Sheets-Sheet 1
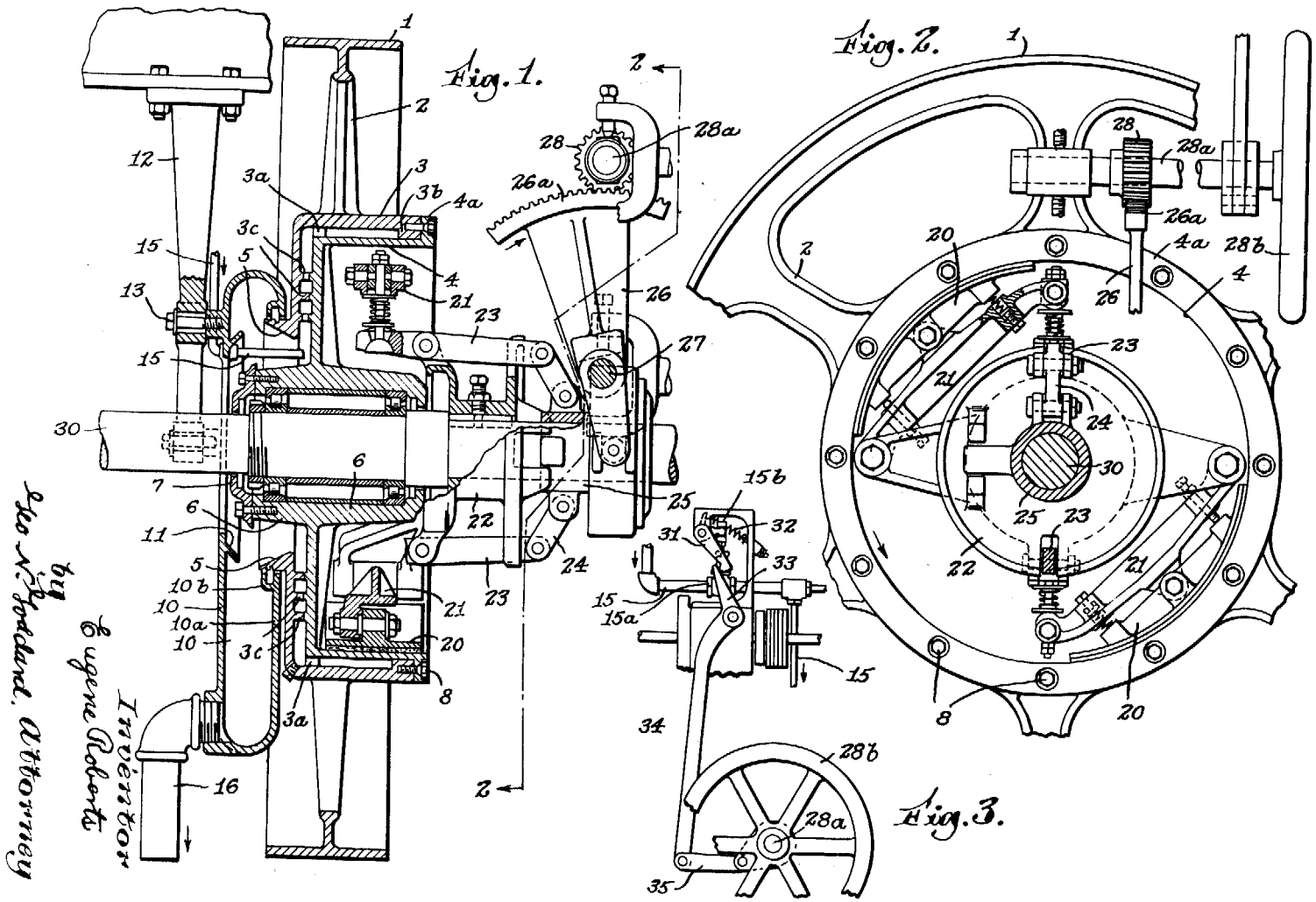

May 3, 1938. E. ROBERTS Re. 20,715
LIQUID COOLED FRICTION DRUM
Original Filed March 9, 1935 2 Sheets-Sheet 2
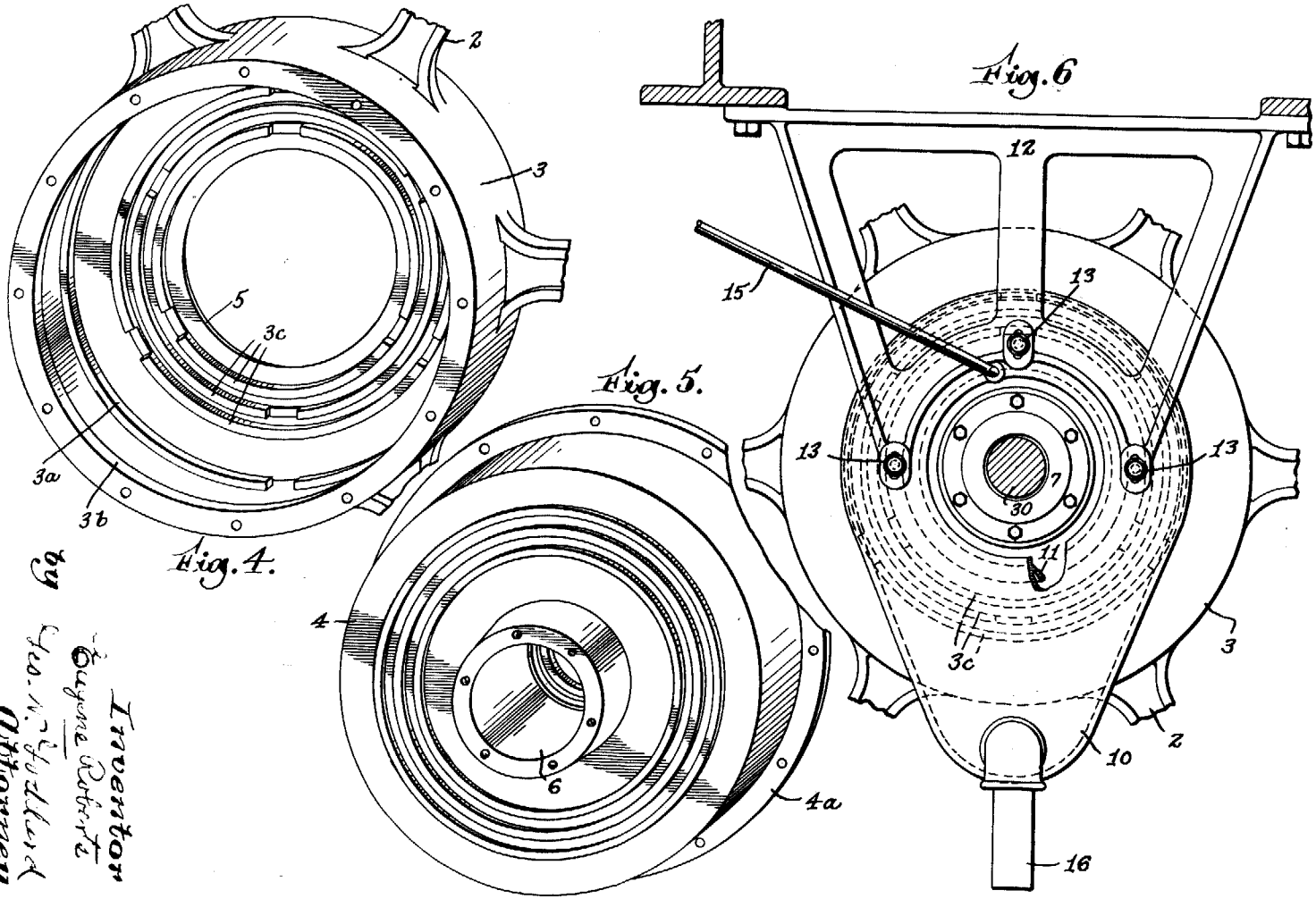
Inventor
Eugene Roberts
by Geo. N. Goddard
Attorney Reissued May 3, 1938

Re. 20,715

UNITED STATES PATENT OFFICE 20,715

LIQUID COOLED FRICTION DRUM

Eugene Roberts, Hastings, N. Y., assignor to The Western States Machine Company, Salt Lake City, Utah, a corporation of Utah Original No. 2,060,826, dated November 17, 1936, Serial No. 10,315, March 9, 1935. Application for reissue April 13, 1937, Serial No. 136,611

11 Claims. (Cl. 192—113)

This invention relates to the cooling of friction drums by circulating therein a cooling liquid for the purpose of conducting away the heat generated by friction and thus preserving against rapid disintegration the friction pads, either of a driving clutch or of a brake mechanism, as the case may require. Where friction drums are subjected to very frequent engagement with friction pads at brief intervals, the heating of the drum and pads leads to very rapid deterioration of the brake or clutch pad linings which entails not only great loss of efficiency but frequent replacements of the friction lining material.

It is the object of the present invention to minimize these faults by providing means for preventing the undue or excessive heating of the friction rim by a construction that permits the circulation of the cooling liquid and the dissipation of the heat generated by such friction. Another object of the invention is to provide an improved liquid-cooled friction drum construction which is capable of long use without deterioration and which, in use, is safe-guarded against impairment of the friction surfaces of the drum or the operative parts of the construction by escaping cooling liquid. Still another object is to provide a construction of this kind which in no way interferes with free use of either inner or the outer surfaces of the drum for braking or clutching puposes.

To these ends the invention comprises, generally speaking, a hollow drum friction rim provides space for the circulation therethrough of cooling liquid, in conjunction with means for carrying off the heated portions of the liquid without splashing or wetting the adjacent parts of the apparatus. Another feature of the invention resides in the construction and arrangement by which the control of the supply of liquid is made interdependent upon the means for controlling the application of the friction pads of the clutch or the brake, as the case may be, so that the cooling liquid is supplied intermittently under automatic control according to the particular needs of each case.

These and other features of the invention will be described in the following specification and will be defined in the claims hereto annexed.

In the accompanying drawings I have shown the principles of this invention applied in a practical manner to the cooling of a friction clutch drum associated with a belt pulley, as disclosed in my Letters Patent No. 1,884,873 dated October 25, 1932, but it will be understood that the same principle is applicable to other forms of clutch drums or brake drums which are used in conjunction with friction pads or bands without limitation to structural details shown in the drawings.

In the drawings,

Fig. 1 is a vertical central section through the drum and offtake casing showing a portion of the clutch mechanism of my aforesaid patent.

Fig. 2 is a vertical section on the sectional plane indicated by broken lines 2—2 on Fig. 1.

Fig. 3 is a front elevation illustrating the interconnection between the shipper shaft of the clutch mechanism and the automatically closed cut-off valve of the water supply pipe.

Fig. 4 is a perspective view of the outer member of the hollow friction drum showing the interior construction thereof.

Fig. 5 is a perspective view of the inner friction member as viewed from the outside.

Fig. 6 is a side elevation showing the offtake casing in assembled relation to the complete drum.

In the practice of the invention according to the form illustrated in the drawings, I have shown a belt pulley comprising an outer rim 1 for engagement with a belt connected by means of a radial arm spider 2 with a concentric friction rim which, in this case, comprises an outer member 3 and an inner member 4. In view of the fact that the heat developed by friction is rapidly conducted away from the friction rim, it is obvious that a separate belt rim is not essential.

The essence of the present invention resides in the construction of the friction drum and its associated parts. In this case the inner member of the drum comprises an annular hub 6 mounted for revolution about the axis of the central shaft 30 and an inner rim member 4 of angular cross section, whose periphery is dimensioned to fit snugly inside the outer rim member 3 which is also of angular cross section. The inner rim member 4 is provided with an outwardly projecting annular flange 4a which overlaps the edge of the open side of the outer member 3 and is secured thereto by an annular series of fastening bolts 8.

The cylindrical portions of the inner and outer rim members are held in spaced relation by means of annular spacing flanges 3a and 3b, the former of which is notched at intervals to permit the inflow and outflow of the cooling liquid into the space between the cylindrical portions of the respective rim members.

Annular spacing flanges 3c are also provided between the radial walls of the rims 3 and 4 and, as best illustrated in Fig. 4, these lateral flanges or rings are provided with notches, those of each ring being circumferentially offset or staggered in relation to the next ring in order to facilitate circumferential flow of the cooling liquid.

A short distance inside the circulating rings or flanges 3c the outer rim member is provided with a laterally projecting annular flange 5 whose interior surface is preferably outwardly flared, said flange surrounding the adjacent portion of the hub 6 of the inner member so as to leave an annular space between these two parts, and through this annular space is carried an inlet or supply pipe 15, whose open inner end delivers the liquid into the radial interspace in which the rings 3c with staggered notches are located.

Provision is made for collecting and disposing of heated liquid discharged from the interior of the friction rim. A suitable means includes a stationary casing 10, whose inner wall 10a is provided with an annular opening bounded by an annular flange 10b, which is preferably grooved to receive a suitable packing ring to fit snugly around the aforesaid flange 5 of the outer rim member, as shown in Fig. 1. The outer wall of the casing 10 is provided with an opening bounded by an annular flange 11, which is preferably flared inwardly and is coaxial with the flange 5.

To protect the interior of the hub 6 from the inflow of liquid an annular sealing cap 7 is bolted to the open end of the hub, its inner edge being annular to closely surround the pulley supporting shaft 30. Obviously any suitable form of packing may be used at this point to exclude the water from access to the interior of the hub.

The draw-off casing 10 is supported in any suitable manner but, as it is desirable to accurately position it with its interior flange 10b concentric with the flange 5 of the friction rim, there is provided a three-arm suspension bracket firmly bolted to an overhead support, each arm being provided with a slotted opening for receiving the fastening bolts 13.

As in the drawings the application of this cooling principle is made to a clutch drum there is shown in Fig. 1 and Fig. 2 of the drawings so much of the clutch drum construction as will make clear the application of the clutch to the friction rim, but as the clutch construction is fully disclosed in the aforesaid United States patent, only a very brief reference to its construction will be made here. It comprises essentially the oppositely disposed clutch shoes 20 pivotally mounted on swinging carrier arms 21, whose rearward ends are connected with retracting levers 23 pivotally mounted on a spider 22 and connected by toggle links 24 with a sleeve 25 slidable on the shaft 30 and actuated by a clutch fork member 26 pivotally mounted on a fixed fulcrum member 27 and having at its outer end a toothed segment 26a intermeshing with a pinion 28 on the horizontal shipper shaft 28a, which carries a hand wheel 28b manually operable to energize or release the clutch.

The supply pipe 15 for delivering liquid into the rim is provided with a suitable cut-off valve at 15a, Fig. 3. This may be of any appropriate type, but as shown the valve stem 15b is engaged by one arm of a crank lever 31, which is normally under tension for clockwise movement by means of a retractile spring 32. The long arm of this crank lever is engaged by the short arm 33 of a lever 34, which is actuated by means of a link connection 35 with the shipper shaft 28a. Clockwise rotation of the shipper shaft produces a similar clockwise rotation of the lever 34, which acts through the short arm 33 to rock the angle lever 31 in counterclockwise direction against the tension of the spring 32, it being understood that the clockwise rotation of the hand wheel 28b and of the shaft 28a acts to throw in the clutch and at the same time open the supply pipe valve to admit water to the interior of the friction rim of the drum.

As the drum starts its revolution the inflowing water is thrown centrifugally toward the periphery of the friction rim, and when the interspace of the friction rim is filled any surplus water admitted escapes over the edge of the flange 5 into the offtake casing 10, whence it is discharged by the offtake pipe 16. When the drum ceases rotation the liquid in the upper portion of the rim will escape through the outlet opening into the casing 10, leaving only the lower portion of the rim up to the lower edge of the flange 5 with the residue of the liquid.

In practical tests on a 40 inch sugar centrifugal I have been able to operate the machine at 40 cycles per hour and have found it possible at that rate to hold the heat down to about 130° Fahrenheit, that is, at a point where the most delicate belt or brake lining would not be in any way injured by the heat. Inasmuch as such centrifugals are operated on cycles of from two to three minutes' duration, it will be seen that the problem of preserving clutch or brake linings against disintegration by heat of the friction pads on the friction rim, which has been a very serious difficulty in this and in other arts where short cycles of operation are used, has been successfully overcome.

What I claim is:

1. A water cooled friction drum for centrifugals and the like embracing in its construction an axially bored hub for receiving a central shaft, a hollow friction rim comprising outer and inner members secured together in spaced relation to form intervening radial passages communicating with an outer, annular, outwardly closed passage for the circulation of liquid, a stationary casing provided with a lateral opening surrounding the central shaft and forming in conjunction with a corresponding opening in the outer rim member a spill-way for allowing the escape of the overflow liquid in the rim into said casing and means for supplying cooling liquid to said circulating passages.

2. A water cooled friction drum embracing an axially bored hub for receiving a central shaft, a hollow friction rim comprising outer and inner members secured together in spaced relation to form intervening passages for the circulation of a cooling liquid, the inner member being rigidly supported on the hub by a connecting annular spider and serving as a support for the outer member, one of said members being provided with annular flanges subdividing the intermediate space into smaller passages, the outer member being provided with an outlet passage surrounding the hub member and bounded by an annular laterally projecting flange, a stationary casing provided with a lateral opening adapted to surround said annular flange, thereby allowing the escape of liquid from the rim into said casing, and means for supplying liquid to the interior of said hollow rim.

3. A water cooled friction drum embracing in its construction an axially bored hub member, a hollow annular friction rim of angular cross section comprising outer and inner members detachably secured together and spaced apart by intervening annular flanges to provide circulating passages for the liquid, the outer member being provided with a lateral opening surrounding the hub and having an annular laterally projecting flange for the escape of liquid from said rim, a stationary casing surrounding said flange and arranged to receive the overflow liquid from said rim, and a liquid supply pipe projecting inwardly between said flange and the hub to deliver liquid to the circulating passages in said rim.

4. A water cooled friction drum embracing in its construction a central hub, an angular concentric flange comprising a cylindrical rim and a radial flange connecting it with the hub, an outer member comprising an exterior rim and a radial flange, both overlapping the first-named rim and its flange and forming therewith an intervening annular passage of L-shaped cross section which is enclosed except at its inner end, the inner edge of the outer member terminating in a lateral annular flange surrounding the hub and spaced therefrom to provide an outlet for the escape of liquid from the passage, a liquid supply pipe projecting through said lateral opening of the outer member to deliver liquid to the inner portion of said L-shaped passage, and a stationary casing including parts surrounding said annular flange for receiving the liquid escaping through said lateral opening.

5. A water cooled friction drum comprising a central hub, inner and outer annular rim members of angular cross section secured together in spaced relation, thereby producing an interior passage also of angular cross section for circulation of cooling liquid, the outer member being provided with a circular opening encircling the hub in spaced relation thereto and having the edge portion of said opening projecting outward to form an annular discharge lip, a stationary casing whose inner wall closely encircles said annular lip to receive liquid discharging through said opening, and a supply pipe whose delivery end projects through said opening to deliver liquid to the interior circulating passage.

6. In a friction clutch drum the combination with an axially bored hub mounted on a central shaft by interposed friction bearings, a hollow friction rim of angular cross section supported on said hub and provided with an inside cylindrical clutch-engaging surface and having a circular opening on the opposite side for the admission and escape of cooling liquid, a stationary casing arranged in close proximity to said circular opening and forming a receptacle for the reception of the escaping liquid, and a stationary supply pipe projecting into said circular opening for delivering liquid therethrough into the interior of said hollow rim structure.

7. The combination of a revoluble drum having a hollow friction rim structure of L-shaped cross section mounted upon a central hub, said rim structure being provided with a lateral outwardly projecting annular discharge flange having a flared interior surface, a stationary casing comprising an inner and outer wall provided with opposed openings, the outer wall having an inwardly projecting outwardly flared deflecting flange arranged opposite said annular discharge flange of the rim.

8. A water cooled friction pulley for a horizontal shaft embracing in its construction a hub member comprising a hub and a rim united by a radial spider, and an outer member comprising a rim member dimensioned to overlap the rim and the spider of the hub member and secured thereto in spaced relation to form communicating radial and annular passages for the circulation of water, the rim member being centrally apertured and provided with an annular lip, an overflow casing having a lateral aperture for surrounding said lip and receiving the circulated water discharged through said aperture, and means for supplying cooling liquid to the circulating passages aforesaid.

9. A liquid cooled friction drum for centrifugals and the like comprising a laterally extending annular hollow friction rim and a radially inwardly extending portion connected therewith, said rim having substantially unobstructed inner and outer faces providing surfaces suitable for braking or clutching purposes, means for mounting said drum for rotation about its axis, means for supplying cooling liquid to said hollow rim through said radially extending portion, an outlet opening in the outside of said rim for discharging excess cooling liquid therefrom and means adjacent said outlet opening to collect and dispose of said excess cooling liquid.

10. A liquid cooled friction drum of angular cross section comprising a hollow friction rim and a communicating hollow radially inwardly extending portion, a circular opening leading into said radially extending portion, means for delivering liquid through said circular opening and radially extending portion into the interior of said hollow rim and means adjacent said opening to receive excess cooling liquid therefrom, said rim and radially extending portion being constructed to prevent escape of cooling liquid therefrom except through said opening.

11. A liquid cooled friction drum embracing in its construction a hollow annular friction rim and a channelled radially extending portion supporting the same and together therewith forming communicating radial and annular passages for the circulation of liquid, a stationary casing provided with a lateral opening adjacent the drum, a cooperating opening in the radially extending portion forming in conjunction with the aforesaid opening a spillway for allowing the escape of overflow liquid from the drum into said casing, and means for supplying cooling liquid to said communicating passages, said rim and radially extending portion being constructed to prevent escape of liquid therefrom except through the opening last recited.

EUGENE ROBERTS.

CERTIFICATE OF CORRECTION.

Reissue No. 20,715. May 3, 1938.

EUGENE ROBERTS.

It is hereby certified that error appears in the printed specification of the above numbered patent requiring correction as follows: Page 3, second column, line 31, claim 9, for the word "rim" read drum; and that the said Letters Patent should be read with this correction therein that the same may conform to the record of the case in the Patent Office.

Signed and sealed this 28th day of June, A. D. 1938.

Henry Van Arsdale,
Acting Commissioner of Patents.

(Seal)